United States Patent
Jenkins et al.

(10) Patent No.: US 9,437,053 B2
(45) Date of Patent: Sep. 6, 2016

(54) DETERMINING PORTIONS OF A ROADWAY MODEL REQUIRING UPDATING

(71) Applicant: Geodigital International Inc., Hamilton (CA)

(72) Inventors: Alastair Nigel Jenkins, Etobicoke (CA); Richard James Pollock, Aurora (CA)

(73) Assignee: Geodigital International Inc., Hamilton (CA)

( * ) Notice: Subject to any disclaimer, the term of this patent is extended or adjusted under 35 U.S.C. 154(b) by 0 days.

(21) Appl. No.: 14/589,616

(22) Filed: Jan. 5, 2015

(65) Prior Publication Data

US 2015/0193988 A1    Jul. 9, 2015

Related U.S. Application Data

(60) Provisional application No. 61/923,923, filed on Jan. 6, 2014.

(51) Int. Cl.
*G07C 5/00* (2006.01)
*G09B 29/10* (2006.01)

(52) U.S. Cl.
CPC ............. *G07C 5/008* (2013.01); *G09B 29/106* (2013.01)

(58) Field of Classification Search
CPC ........ G05D 1/00; G05D 1/0287; G07C 5/00; G07C 5/008; G09B 29/106
USPC ............................................ 701/31.5, 23–36
See application file for complete search history.

(56) References Cited

U.S. PATENT DOCUMENTS

| 5,170,352 | A | 12/1992 | McTamaney et al. |
| 6,047,234 | A * | 4/2000 | Cherveny .............. G01C 21/26 340/988 |
| 6,385,539 | B1 * | 5/2002 | Wilson ................... G01C 21/30 340/905 |
| 7,706,971 | B2 | 4/2010 | Jaugilas et al. |
| 8,521,352 | B1 * | 8/2013 | Ferguson ............. G05D 1/0274 340/435 |

(Continued)

OTHER PUBLICATIONS

Patent Cooperation Treaty, "International Search Report and Written Opinion of the International Searching Authority" issued in International Application No. PCT/CA2014/000918, by Canadian Intellectual Property Office, document of 7 pages, Apr. 17, 2015.

* cited by examiner

*Primary Examiner* — Thomas Tarcza
*Assistant Examiner* — Tyler J Lee
(74) *Attorney, Agent, or Firm* — Richard P. Gilly; Offit Kurman, P.A.

(57) ABSTRACT

A computer-implemented method for determining which portions of a roadway model used by self-driving road vehicles require updating uses discrepancy data derived from the sensors of a plurality of self-driving road vehicles. The discrepancy data may indicate discrepancies between the sensor data and the roadway model, or may indicate portions of the roadway where a self-driving road vehicle underperformed. The discrepancy data is aggregated, and the aggregated discrepancy data is used to identify, as the portions of the roadway model which require updating, those portions of the roadway model corresponding to portions of the roadway for which the aggregated discrepancy data exceeds a threshold.

14 Claims, 3 Drawing Sheets

(56) References Cited

U.S. PATENT DOCUMENTS

| | | | |
|---|---|---|---|
| 8,527,199 B1* | 9/2013 | Burnette | G01C 21/32 701/23 |
| 8,676,430 B1* | 3/2014 | Ferguson | G05D 1/0274 340/435 |
| 8,903,591 B1* | 12/2014 | Ferguson | G05D 1/0274 340/435 |
| 9,056,395 B1* | 6/2015 | Ferguson | G08G 1/09623 |
| 2002/0133329 A1* | 9/2002 | Kano | G06F 17/5009 703/22 |
| 2009/0138497 A1 | 5/2009 | Zavoli et al. | |
| 2014/0067187 A1* | 3/2014 | Ferguson | B60W 30/00 701/28 |

US 9,437,053 B2

DETERMINING PORTIONS OF A ROADWAY MODEL REQUIRING UPDATING

CROSS-REFERENCE TO RELATED APPLICATION

This application claims priority to U.S. Provisional Patent Application No. 61/923,923 filed on Jan. 6, 2014, the teachings of which are hereby incorporated by reference.

TECHNICAL FIELD

The present disclosure relates to roadway models used for self-driving road vehicles, and more particularly to determining portions of a roadway model requiring updating.

BACKGROUND

Self-driving road vehicles rely on an array of sensors and a roadway model representing features of the roadway on which the self-driving road vehicle is travelling. The roadway model is derived from survey data of the roadways (e.g., point clouds, georeferenced images) acquired on an earlier date. The control system, typically incorporating an onboard computer, uses the sensors to obtain information about the environment, which can then be used in conjunction with the roadway model to direct the self-driving road vehicle along the roadway while complying with traffic signals and avoiding collisions with pedestrians and other vehicles. Self-driving road vehicles can navigate autonomously on a roadway without human intervention.

In order for a self-driving road vehicle to operate effectively, the roadway model upon which it relies must be sufficiently up to date. For example, if the position of a highway on-ramp or off-ramp on the real-world roadway has changed but the roadway model does not reflect this change, a self-driving road vehicle may be unable to navigate from or to the ramp. Even less significant changes or discrepancies between the roadway and the roadway model, such as fading or repainting of lane markings, can impede the performance of self-driving road vehicles.

Thus, it is important that the roadway model be kept up to date. At the same time, however, updating a roadway model involves traversing the corresponding roadway with a sensor-laden vehicle, followed by processing of the sensor data so obtained. Moreover, because it is not necessarily known which portions of the roadway have changed so as to require updating of the corresponding portions of the roadway model, the entire roadway must be traversed. This can be a very expensive process for a roadway that comprises an extensive network of roads. Thus, the cost of updating the roadway model may deter the custodian of the roadway model from keeping the roadway model as up to date as possible.

SUMMARY

The control system for self-driving road vehicles can include an algorithm that determines discrepancy data that may indicate that the roadway model is out of date. The discrepancy data may be obtained by noting portions of the roadway where the self-driving road vehicle underperformed, or by comparing the currently-sensed road properties and road-related features with the contents of the roadway model. The control system can be connected to a communication system that sends the discrepancy data to a processing hub for analysis. Alternatively, sensor data may be sent to the processing hub and the processing hub may determine discrepancy data. The self-driving road vehicle may have a communication system for another purpose (e.g., vehicle and personal security) that can also be used to communicate discrepancy data and/or sensor data. The processing hub would receive (or determine) the discrepancy data and analyze it to determine significance. The analysis could look for consistencies in discrepancy data for the same location that have been received from multiple self-driving road vehicles. From the results of analyzing the discrepancy data, the processing hub would augment an ongoing plan for the reacquisition of data that would be used to update the roadway model in order to balance the need for roadway model currency against the cost of generating updates.

In one aspect, a computer-implemented method for determining which portions of a roadway model representing a real-world roadway require updating comprises maintaining a roadway model of the real-world roadway. The roadway model is sufficient to enable autonomous driverless operation of a self-driving road vehicle. The method further comprises receiving, from a plurality of self-driving road vehicles on the roadway, discrepancy data for known positions on the roadway, and aggregating the discrepancy data into aggregated discrepancy data. The aggregated discrepancy data comprises, for at least some portions of the roadway, discrepancy data from a plurality of individual self-driving road vehicles. The method further comprises using the aggregated discrepancy data to identify, as the portions of the roadway model which require updating, those portions of the roadway model corresponding to portions of the roadway for which the aggregated discrepancy data exceeds a threshold.

In another aspect, a computer-implemented method for determining which portions of a roadway model representing a real-world roadway require updating comprises maintaining a roadway model of the real-world roadway, with the roadway model being sufficient to enable autonomous driverless operation of a self-driving road vehicle, and receiving, from a plurality of self-driving road vehicles on the roadway, from at least one sensor carried by each self-driving road vehicle, sensor data associated with known positions on the roadway. The sensor data represents at least one feature of the roadway corresponding to a model feature in the roadway model. The method further comprises using the sensor data to determine discrepancy data and aggregating the discrepancy data into aggregated discrepancy data. The aggregated discrepancy data comprises, for at least some portions of the roadway, discrepancy data from a plurality of individual self-driving road vehicles. The method further comprises using the aggregated discrepancy data to identify, as the portions of the roadway model which require updating, those portions of the roadway model corresponding to portions of the roadway for which the aggregated discrepancy data exceeds a threshold.

The discrepancy data may identify positions on the roadway where the self-driving road vehicles experienced underperformance.

The discrepancy data may represent discrepancies, at known positions on the roadway, between information in the roadway model and sensor data from at least one sensor carried by each self-driving road vehicle.

The sensor data may include at least one of image data, radar data, LIDAR data, GNSS data, INS data, IMU data, accelerometer data, inclinometer data, vibration sensor data, compass data, magnetometer data, color sensor data, weather sensor data and sound data.

The threshold may be, for example, a predetermined, fixed threshold or an adaptive threshold. The threshold may be generated by applying a statistical model to the discrepancy data.

In another aspect, a computer-implemented method for providing data for use in determining which portions of a roadway model representing a real-world roadway require updating comprises storing, by a data storage device carried by a self-driving road vehicle traveling on the roadway, a copy of at least part of the roadway model corresponding to a part of the roadway on which the self-driving road vehicle is travelling. The roadway model is sufficient to enable autonomous driverless operation of the self-driving road vehicle. The method further comprises obtaining, while the self-driving road vehicle is traveling on the roadway, sensor data from at least one sensor carried by the self-driving road vehicle. The sensor data represents at least one feature of the roadway at a known position on the roadway and corresponding to a model feature in the roadway model. A processor carried by the self-driving road vehicle and coupled to the data storage device uses the sensor data to determine discrepancy data at known positions on the roadway, and the discrepancy data is transmitted for analysis.

Using the sensor data to determine discrepancy data at known positions on the roadway may comprise identifying positions on the roadway where the self-driving road vehicle experienced underperformance, or may comprise comparing the sensor data to the copy of at least part of the roadway model to determine discrepancies between the sensor data and the roadway model.

The sensor data may include at least one of image data, radar data, LIDAR data, GNSS data, INS data, IMU data, accelerometer data, inclinometer data, vibration sensor data, compass data, magnetometer data, color sensor data, weather sensor data and sound data.

In other aspects, data processing systems and computer program products for implementing the above methods are provided.

BRIEF DESCRIPTION OF THE DRAWINGS

These and other features will become more apparent from the following description in which reference is made to the appended drawings wherein.

DETAILED DESCRIPTION

Figure 1:
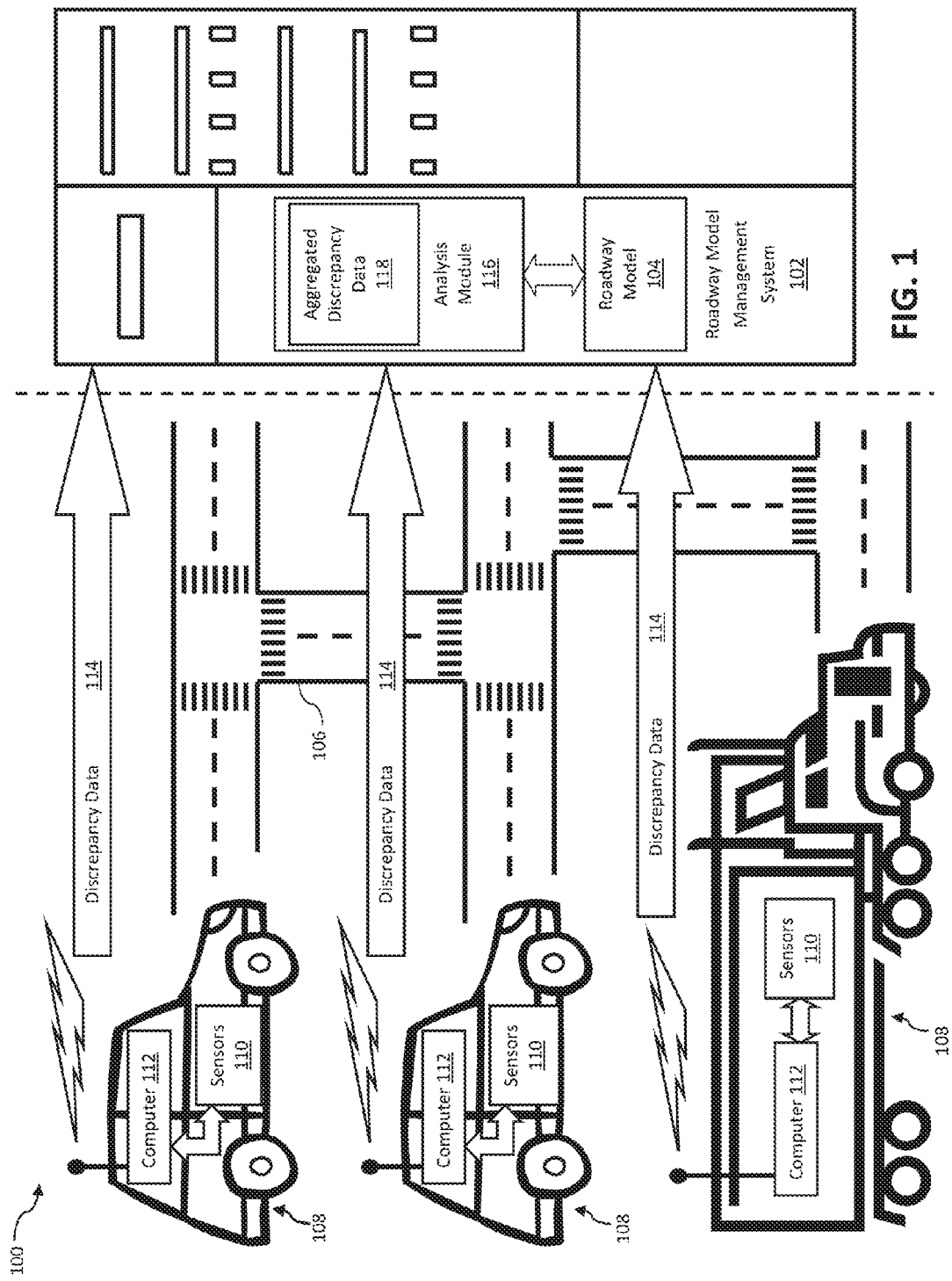
FIG. 1 shows a first method for determining which portions of a roadway model representing a real-world roadway require updating.

Reference is now made to FIG. 1, which shows schematically a first method 100 for determining which portions of a roadway model representing a real-world roadway require updating. A roadway model management system 102, comprising one or more computers, maintains a roadway model 104 modeling a real-world roadway 106. Importantly, the roadway model 104 is more than a simple map that matches roadways to absolute position, such as used in conventional global navigation satellite system (GNSS) applications, and is sufficient to enable autonomous driverless operation of a self-driving road vehicle. The roadway model 104 may comprise a spatial database of road properties and road-related features. The model features forming part of the roadway model 104 may include, for example and without limitation:

locations, types and colors of lane markers which affect the ability to change lanes (e.g. Botts dots, dashed single white line, dashed single yellow line, solid single white line, solid single yellow line, white double line, yellow double line, white solid line with white dashed line, yellow solid line with yellow dashed line, markings that are missing or indiscernible, etc.);
locations of highway exits;
locations and dimensions of intersections;
locations of speed-limit changes;
physical characteristics of the roadway and roadway edges; and
road names (start and end of road with a fixed road name).

A plurality of self-driving road vehicles 108 drive autonomously on the roadway 106. Although human beings may be present in the self-driving road vehicles 108, the self-driving road vehicles 108 traverse the roadway 106 without human control. Each of the self-driving road vehicles 108 carries an array of sensors 110. Although shown as a single element simply for ease of illustration, in practice the sensors 110 will typically be distributed about the self-driving road vehicle 108. The sensors 110 may include, for example and without limitation, image sensors, radar sensors, LIDAR sensors, GNSS sensors, inertial navigation systems, inertial measurement units (IMU), accelerometers, inclinometers, vibration sensors, compasses, magnetometers, color sensors, light sensors, weather sensors and sound sensors, which may generate, respectively, image data, radar data, LIDAR data, GNSS data, INS data, IMU data, accelerometer data, inclinometer data, vibration sensor data, compass data, magnetometer data, color sensor data, weather sensor data and sound data. The sensors 110 are coupled to respective onboard computers 112 carried by the self-driving road vehicles 108, which, as will be apparent to one skilled in the art, comprise a processor coupled to a data storage device. The onboard computer 112 is also connected to the vehicle controls (steering, acceleration, braking) of the respective self-driving road vehicle 108. Software that runs on the onboard computer 112 controls the self-driving road vehicle 108, and computes driving tactics by knowing where the self-driving road vehicle 108 is and comparing an analysis of the data from the sensors 110 with the roadway model 104. As such, the onboard computer 112 is a control system for the self-driving road vehicle 108.

The self-driving road vehicles 108, in particular the sensors 110 and computers 112 thereof, provide data for use in determining which portions of the roadway model 104 require updating.

The data storage device of the computer 112 of each self-driving road vehicle 108 stores a copy of at least part of the roadway model 104; that is, at least the part of the roadway model 104 corresponding to the part of the roadway 106 on which the self-driving road vehicle 108 is travelling. The data storage device of the computer 112 of each self-driving road vehicle 108 may store a copy of the entire roadway model 104, or may periodically obtain, for example from the roadway model management system 102, a copy of the part of the roadway model 104 corresponding to the part of the roadway 106 on which the self-driving road vehicle 108 is travelling.

While the self-driving road vehicles 108 are traveling on the roadway, the sensors 110 obtain sensor data representing at least one feature of the roadway 106 corresponding to a model feature in the roadway model 104. For example, as noted above the roadway model 104 may indicate the presence, colour, and line style of lane markings of the roadway as model features, and the sensors 110 may obtain sensor data portraying the position, color and line style of lane markings on the roadway.

For each of the self-driving road vehicles 108, the processor of the computer 112 uses the sensor data to determine discrepancy data 114. In some embodiments, the computer 112 compares the sensor data to the copy of at least part of the roadway model 104, and the discrepancy data 114 represents discrepancies between the sensor data and the roadway model 104 at known positions on the roadway 106. In other embodiments, the discrepancy data 114 identifies positions on the roadway where the self-driving road vehicles 108 experienced underperformance; i.e. the sensors 110 do not have to detect a difference between the sensor data and the roadway model 104 to record discrepancy data 114—the computer 112 may simply detect that the self-driving road vehicle 108 performs poorly on a particular portion of the roadway 106. For example the self-driving road vehicle 108 may pull to the right on an off-ramp, resulting in the self-driving road vehicle 108 moving out of the center of the lane (as detected by analyzing sensor output from a sensor 110 such as image data from a camera looking at the white lines). This may be due to fading or repainting of lane markings in slightly different locations, or the shape of the road having changed due to construction—the computer 112 on the self-driving road vehicle 108 does not have to know the cause of the underperformance; it can simply report that the control strategy was not optimal or that the self-driving road vehicle 108 behaved erratically. If reported by multiple self-driving road vehicles 108, discrepancy data for a particular portion of the roadway 106 might warrant a re-survey of that portion of the roadway 106, either because changes have occurred or because the relevant data in the roadway model 104 is in need of improvement.

Where the discrepancy data 114 represents discrepancies between the sensor data and the roadway model 104 at known positions on the roadway 106, the discrepancy data 114 can be determined in a number of ways, some non-limiting examples of which are described below.

In one exemplary implementation, the computer 112 may predict from the roadway model what the raw or lightly processed (e.g. normalized for different environmental conditions) sensor data are expected to be and then compute the difference between the predicted and actual sensor data. The computer 112 may use a predetermined probabilistic model of the sensor noise in order to determine when differences are significant (i.e., beyond what would be caused by the noise alone, to a specified level of confidence). The sensor data prediction may either be precomputed and packaged with the roadway model 104, or computed as the copy of the roadway model 104 is referenced by the computer 112. For example, from the type of road surface represented in the roadway model 104 and the characteristics of the self-driving road vehicle 108, accelerometer outputs may be predicted and compared to actual accelerometer outputs—a significant different would suggest a difference between the road surface represented in the roadway model 104 and the actual road surface of the roadway 106.

In another exemplary implementation, the computer 112 may derive from the actual sensor data roadway features that are directly comparable to roadway features that are represented by the roadway model 104. For example, the presence, colour, and line style of lane markings on the roadway 106 would be derived from the actual sensor data and compared to the presence, colour, and line style of lane markings portrayed by the roadway model 104. If there is a disagreement, then either the simple fact that there is a disagreement along with the location of the disagreement, or the derived-from-sensor features along with the location of the features would be used as discrepancy data 114.

In yet another exemplary implementation, the computer 112 may predict from the roadway model 104 some features that are not used for vehicle navigation but are useful for determining possible changes to those features that are used for vehicle navigation and are also readily derived from the actual sensor data. An example of this is a lateral elevation profile of the roadway 106 that would capture height and offset from the road centreline of roadside barriers and objects, and range data from a LIDAR sensor on the self-driving road vehicles 108 could be processed into an actual lateral elevation profile. The predicted feature could either be precomputed and stored with the roadway model 104, or computed as the copy of the roadway model 104 is referenced. The predicted and derived-from-sensor data feature would be compared to a model of the likelihood of random differences in various aspects of the feature (e.g., likelihood of difference in the road surface portion of the profiles versus likelihood of difference in the road margin portion of the profiles) and cumulative likelihood of the actual differences could be used as discrepancy data 114.

Once the discrepancy data 114 is determined, the computer 112 then transmits the discrepancy data 114 to the roadway model management system 102. For example, the computer 112 may include or be coupled to a wireless communication module for wirelessly transmitting and receiving data, as is known in the art. The self-driving road vehicle may have a communication system for another purpose (e.g., vehicle and personal security) that can also be used for this communication. In a preferred embodiment, the discrepancy data 114 is determined and transmitted without any intervention from a human operator.

The roadway model management system 102 receives the discrepancy data 114 from the self-driving road vehicles 108 on the roadway 106, in particular from the onboard computers 112, and uses an analysis module 116 to aggregate the discrepancy data 114 into aggregated discrepancy data 118. The aggregated discrepancy data 118 comprises, for at least some portions of the roadway 106, discrepancy data 114 from a plurality of individual self-driving road vehicles 108. In other words, a plurality of individual self-driving road vehicles 108 have driven along the same portions of the roadway 106 so that there is discrepancy data 114 from a plurality of self-driving road vehicles 108 for those portions of the roadway 106. The analysis module 116 of the roadway model management system 102 uses the aggregated discrepancy data 118 to identify, as the portions of the roadway model 104 which require updating, those portions of the roadway model 104 corresponding to portions of the roadway 106 for which the aggregated discrepancy data exceeds a threshold. In other words, where there are significant discrepancies between the sensor data from the real-world roadway 106 and the roadway model 104 for a given portion of the roadway 106, or where there are portions of the roadway 106 for which a significant number of self-driving road vehicles 108 report underperformance (i.e. the underperformance is repeatable rather than random), this may indicate that that portion of the roadway model 104 is in need of updating. This information can then be used to dispatch one or more survey vehicles to the relevant location or to modify an existing plan for updating the roadway model 104 to include the newly identified portions of the roadway 106. The threshold may be, for example, a predetermined, fixed threshold, an adaptive threshold or a threshold generated by applying a statistical model to the discrepancy data 114.

Some non-limiting examples of techniques for identifying those portions of the roadway model 104 corresponding to portions of the roadway 106 for which the aggregated discrepancy data exceeds a threshold are described below.

One implementation involves a multi-stage assessment. A first stage targets portions of the roadway 106 and roadway model 104 that have exceptionally frequent occurrences of discrepancy data 114 within a defined time window, and at a second stage the consistency of the discrepancy data 114 from the various self-driving road vehicles 108 is analyzed. The first stage would reduce the amount of computing that would have to be done in the second stage. The second stage would involve a deterministic or probabilistic model of random differences discrepancy data 114 from the different self-driving road vehicles 108 in order to determine whether the level of consistency is accidental or real to a specified level of confidence.

Another implementation targets those locations that have exceptionally frequent occurrences of discrepancy data within a defined time window, and, for those locations, commands all or a subset of the self-driving road vehicles 108 to transmit back to the roadway model management system 102 additional data on those locations. Such a command need not require that the self-driving road vehicles 108 make a special trip to the relevant locations, and may only request that the self-driving road vehicles 108 should capture and transmit the additional data the next time they traverse those locations in the ordinary course. The additional data may comprise a series of still images or video streams that could be directly compared, automatically or manually, with still images or video streams acquired when the data for the roadway model 104 were acquired. Still images or video streams, or other highly descriptive and dense data, from all self-driving road vehicles 108 all the time may be prohibitively expensive to transmit, store and analyze, but such data from very few self-driving road vehicles 108 for short periods of time may be more manageable.

Figure 2:
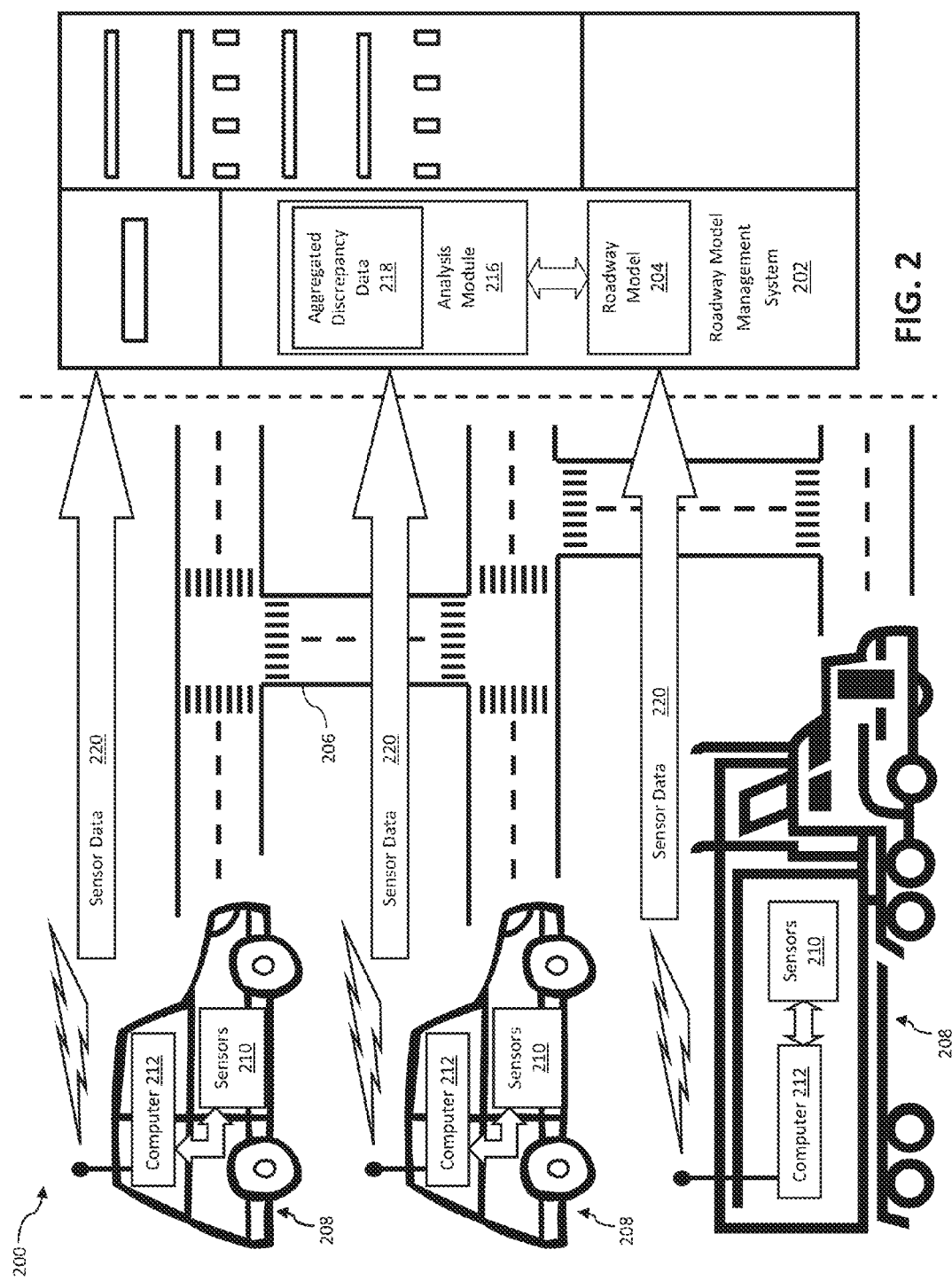
FIG. 2 shows a second method for determining which portions of a roadway model representing a real-world roadway require updating.

Reference is now made to FIG. 2, which shows schematically a second method 200 for determining which portions of a roadway model representing a real-world roadway require updating. The method 200 shown in FIG. 2 is similar to the method 100 shown in FIG. 1, with like reference numerals denoting like features except with the prefix "2" instead of "1". The method 200 shown in FIG. 2 differs from the method 100 shown in FIG. 1 in that instead of computing and transmitting discrepancy data, the onboard computers 212 transmit, and the roadway model management system 202 receives, sensor data 220 associated with known positions on the roadway 206 from the sensors 210 on the self-driving road vehicles 208. The sensor data 220 portrays at least one feature of the roadway 206 corresponding to a model feature in the roadway model 204. The analysis module 216 of the roadway model management system 202 compares the sensor data 220 to the roadway model 204 to identify discrepancy data representing discrepancies between information in the roadway model 204 and the sensor data 220, and then aggregates the discrepancy data into aggregated discrepancy data 218. As with the method 100 shown in FIG. 1, in the method 200 shown in FIG. 2, the analysis module 216 of the roadway model management system 202 uses the aggregated discrepancy data 218 to identify, as the portions of the roadway model 204 which require updating, those portions of the roadway model 204 corresponding to portions of the roadway 206 for which the aggregated discrepancy data exceeds a threshold. Similar techniques to those described in the context of FIG. 1 may be used. Typically, in order to limit the magnitude of transmitted data, only a subset of the self-driving road vehicles 208 would transmit data at any given time.

The Figures illustrate the architecture, functionality, and operation of possible implementations of systems, methods and computer program products according to various embodiments of the present technology. Various aspects of the technology described herein can be implemented by special purpose hardware-based systems that perform the specified functions or acts, or combinations of special purpose hardware and computer instructions.

It also will be understood that aspects of the technology described herein can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions shown and described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions shown and described herein. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
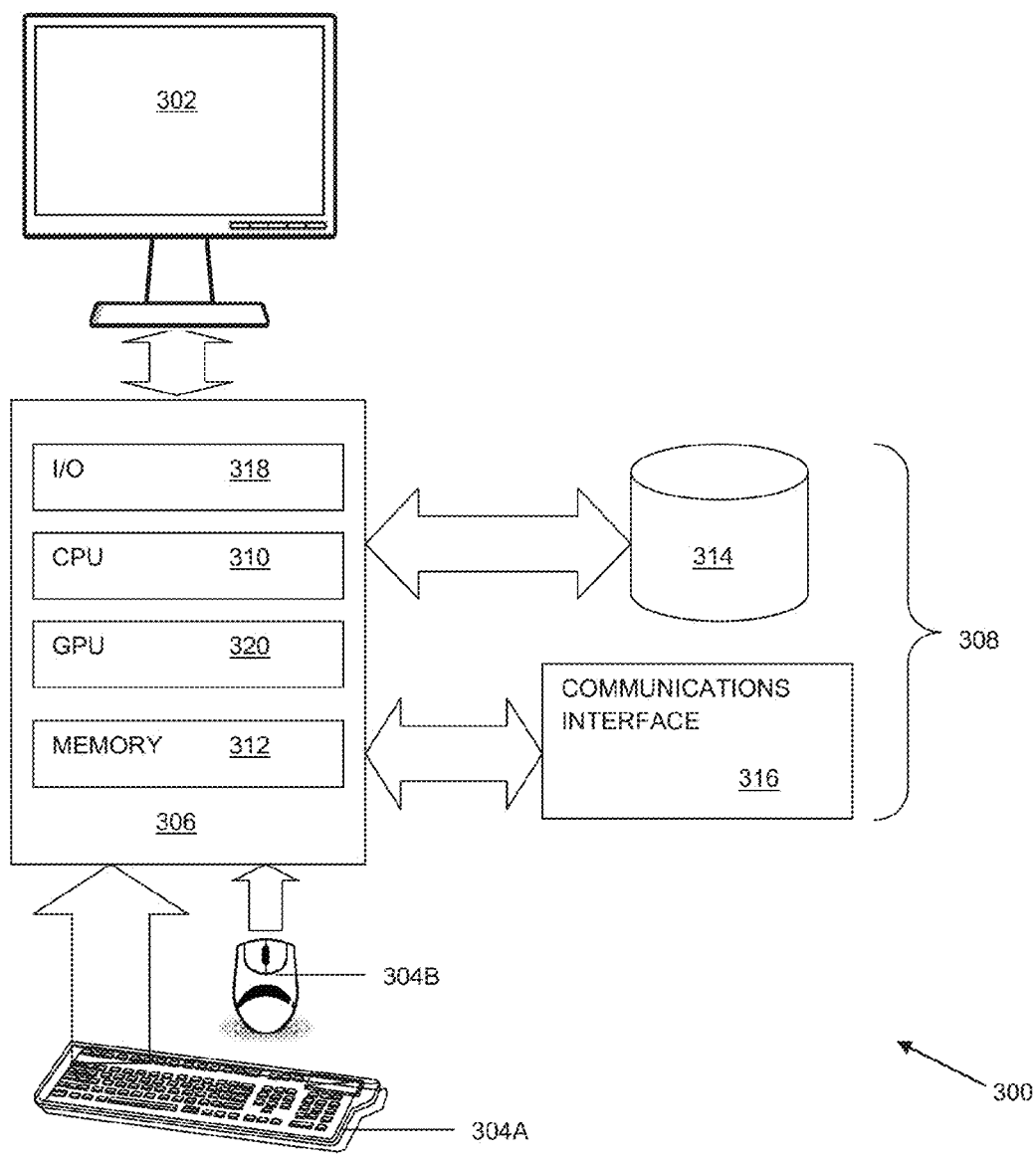
FIG. 3 shows an exemplary computer system which may be used in implementing aspects of the technology described herein.

An illustrative computer system in respect of which the methods herein described may be implemented is presented as a block diagram in FIG. 3. The illustrative computer system is denoted generally by reference numeral 300 and includes a display 302, input devices in the form of keyboard 304A and pointing device 304B, computer 306 and external devices 308. While pointing device 304B is depicted as a mouse, it will be appreciated that other types of pointing device may also be used.

The computer 306 may contain one or more processors or microprocessors, such as a central processing unit (CPU) 310. The CPU 310 performs arithmetic calculations and control functions to execute software stored in an internal memory 312, preferably random access memory (RAM) and/or read only memory (ROM), and possibly additional memory 314. The additional memory 314 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 314 may be physically internal to the computer 306, or external as shown in FIG. 3, or both.

The computer system 300 may also include other similar means for allowing computer programs or other instructions to be loaded. Such means can include, for example, a communications interface 316 which allows software and data to be transferred between the computer system 300 and external systems and networks. Examples of communications interface 316 can include a modem, a network interface such as an Ethernet card, a wireless communication interface, or a serial or parallel communications port. Software and data transferred via communications interface 316 are in the form of signals which can be electronic, acoustic, electromagnetic, optical or other signals capable of being received by communications interface 316. Multiple interfaces, of course, can be provided on a single computer system 300.

Input and output to and from the computer 306 is administered by the input/output (I/O) interface 318. This I/O interface 318 administers control of the display 302, keyboard 304A, external devices 308 and other such components of the computer system 300. The computer 306 also includes a graphical processing unit (GPU) 320. The latter may also be used for computational purposes as an adjunct to, or instead of, the (CPU) 310, for mathematical calculations.

The various components of the computer system 300 are coupled to one another either directly or by coupling to suitable buses.

The term "computer system", as used herein, is not limited to any particular type of computer system and encompasses servers, desktop computers, laptop computers, networked mobile wireless telecommunication computing devices such as smartphones, tablet computers, as well as other types of computer systems.

As will be appreciated by one skilled in the art, aspects of the technology described herein may be embodied as a system, method or computer program product. Accordingly, aspects of the technology described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the presently described technology may take the form of a computer program product embodied in one or more computer readable medium(s) carrying computer readable program code.

Where aspects of the technology described herein are implemented as a computer program product, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Thus, computer readable program code for implementing aspects of the technology described herein may be contained or stored in the memory 312 of the computer 306, or on a computer usable or computer readable medium external to the computer 306, or on any combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the presently described technology may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

One or more currently preferred embodiments have been described by way of example. It will be apparent to persons skilled in the art that a number of variations and modifications can be made without departing from the scope of the claims. In construing the claims, it is to be understood that the use of a computer to implement the embodiments described herein is essential.

What is claimed is:

1. A computer-implemented method for determining which portions of a roadway model representing a real-world roadway require updating, the method comprising:
    maintaining a roadway model of the real-world roadway, the roadway model being sufficient to enable autonomous driverless operation of a self-driving road vehicle;
    receiving, from a plurality of self-driving road vehicles on the roadway, discrepancy data for known positions on the roadway;
    aggregating the discrepancy data into aggregated discrepancy data, wherein the aggregated discrepancy data comprises, for at least some portions of the roadway, discrepancy data from a plurality of individual self-driving road vehicles;
    using the aggregated discrepancy data to identify, as the portions of the roadway model which require updating, those portions of the roadway model corresponding to portions of the roadway for which the aggregated discrepancy data exceeds a threshold; and
    responsive to identifying the portions of the roadway model which require updating, doing at least one of:
        dispatching one or more survey vehicles to the portions of the roadway for which the aggregated discrepancy data exceeds the threshold; and
        modifying an existing plan for updating the roadway model to include the portions of the roadway for which the aggregated discrepancy data exceeds the threshold.

2. The method of claim 1, wherein the discrepancy data identifies positions on the roadway where the self-driving road vehicles experienced underperformance.

3. The method of claim 1, wherein the discrepancy data represents discrepancies, at known positions on the roadway, between information in the roadway model and sensor data from at least one sensor carried by each self-driving road vehicle.

4. The method of claim 3, wherein the sensor data includes at least one of image data, radar data, LIDAR data, GNSS data, INS data, IMU data, accelerometer data, inclinometer data, vibration sensor data, compass data, magnetometer data, color sensor data, weather sensor data and sound data.

5. The method of claim 1, wherein the threshold is a predetermined, fixed threshold.

6. The method of claim 1, wherein the threshold is an adaptive threshold.

7. The method of claim 1, wherein the threshold is generated by applying a statistical model to the discrepancy data.

8. A computer-implemented method for determining which portions of a roadway model representing a real-world roadway require updating, the method comprising:
    maintaining a roadway model of the real-world roadway, the roadway model being sufficient to enable autonomous driverless operation of a self-driving road vehicle;
    receiving, from a plurality of self-driving road vehicles on the roadway, from at least one sensor carried by each self-driving road vehicle, sensor data associated with known positions on the roadway, the sensor data representing at least one feature of the roadway corresponding to a model feature in the roadway model;
    using the sensor data to determine discrepancy data;
    aggregating the discrepancy data into aggregated discrepancy data, wherein the aggregated discrepancy data comprises, for at least some portions of the roadway, discrepancy data from a plurality of individual self-driving road vehicles;
    using the aggregated discrepancy data to identify, as the portions of the roadway model which require updating, those portions of the roadway model corresponding to portions of the roadway for which the aggregated discrepancy data exceeds a threshold; and
    responsive to identifying the portions of the roadway model which require updating, doing at least one of:
        dispatching one or more survey vehicles to the portions of the roadway for which the aggregated discrepancy data exceeds the threshold; and
        modifying an existing plan for updating the roadway model to include the portions of the roadway for which the aggregated discrepancy data exceeds the threshold.

9. The method of claim 8, wherein the discrepancy data identifies positions on the roadway where the self-driving road vehicles experienced underperformance.

10. The method of claim 8, wherein the discrepancy data represents discrepancies, at known positions on the roadway, between information in the roadway model and sensor data from the at least one sensor carried by each self-driving road vehicle.

11. The method of claim 8, wherein the sensor data includes at least one of image data, radar data, LIDAR data, GNSS data, INS data, IMU data, accelerometer data, inclinometer data, vibration sensor data, compass data, magnetometer data, color sensor data, weather sensor data and sound data.

12. The method of claim 8, wherein the threshold is a predetermined, fixed threshold.

13. The method of claim 8, wherein the threshold is an adaptive threshold.

14. The method of claim 8, wherein the threshold is generated by applying a statistical model to the discrepancy data.

* * * * *